United States Patent
Abhyankar et al.

(10) Patent No.: US 10,214,639 B2
(45) Date of Patent: Feb. 26, 2019

(54) POST CONSUMER RECYCLED RESIN COMPOSITION AND MANUFACTURE OF TUBES THEREFROM

(75) Inventors: Chandrashekhar Ramchandra Abhyankar, Mumbai (IN); Mrinal Kanti Banerjee, Mumbai (IN)

(73) Assignee: Essel Propack Ltd., Mumbai (IN)

( * ) Notice: Subject to any disclaimer, the term of this patent is extended or adjusted under 35 U.S.C. 154(b) by 580 days.

(21) Appl. No.: 14/110,221

(22) PCT Filed: Jun. 1, 2012

(86) PCT No.: PCT/IN2012/000384
§ 371 (c)(1),
(2), (4) Date: Dec. 19, 2013

(87) PCT Pub. No.: WO2013/046212
PCT Pub. Date: Apr. 4, 2013

(65) Prior Publication Data
US 2014/0106152 A1    Apr. 17, 2014

(30) Foreign Application Priority Data

Jun. 3, 2011    (IN) .......................... 1641/MUM/2011

(51) Int. Cl.
| | |
|---|---|
| *C08L 23/06* | (2006.01) |
| *B29C 47/00* | (2006.01) |
| *B32B 27/32* | (2006.01) |
| *B32B 7/02* | (2006.01) |
| *C08L 23/08* | (2006.01) |
| *B29K 105/26* | (2006.01) |

(52) U.S. Cl.
CPC ............... *C08L 23/06* (2013.01); *B32B 7/02* (2013.01); *B32B 27/32* (2013.01); *B29C 47/0004* (2013.01); *B29C 47/0023* (2013.01); *B29K 2105/26* (2013.01); *C08L 23/08* (2013.01); *Y02P 20/582* (2015.11); *Y10T 428/24992* (2015.01)

(58) Field of Classification Search
None
See application file for complete search history.

(56) References Cited

U.S. PATENT DOCUMENTS

| | | | |
|---|---|---|---|
| 5,534,317 A * | 7/1996 | Herman | ................... C08J 11/06 |
| | | | 206/524.1 |
| 6,129,880 A | 10/2000 | Kieras et al. | |
| 6,960,375 B2 | 11/2005 | Giblin et al. | |
| 8,083,064 B2 | 12/2011 | Boswell et al. | |
| 2004/0241360 A1 | 12/2004 | Giblin et al. | |
| 2005/0142312 A1* | 6/2005 | Giblin | ..................... C08L 23/06 |
| | | | 428/35.7 |
| 2011/0020615 A1 | 1/2011 | Van Den Bossche et al. | |
| 2011/0105667 A1* | 5/2011 | Brenner | ................... C08L 23/06 |
| | | | 524/423 |

FOREIGN PATENT DOCUMENTS

| | | |
|---|---|---|
| GB | 2 420 384 A | 5/2006 |
| WO | 2004/106173 A1 | 12/2004 |
| WO | 2005/063875 A1 | 7/2005 |

OTHER PUBLICATIONS

English Translation of Shitsupou et al. (JP 2001-234003), Aug. 2001.*
International Search Report for corresponding International Application No. PCT/IN2012/000384, dated Apr. 10, 2013 (2 pages).

* cited by examiner

*Primary Examiner* — Ronak C Patel
(74) *Attorney, Agent, or Firm* — Osha Liang LLP

(57) ABSTRACT

The present disclosure relates to a post consumer recycled polymer composition comprising: 80% to 95% (w/w) of a post consumer recycled resin; and 5% to 20% (w/w) of at least one additive. The present disclosure further relates to a laminate comprising: an outer layer of a post consumer recycled polymer composition; a middle layer of post consumer recycled polymer composition; and an inner layer of virgin resins. The present disclosure also relates to a process for manufacturing tubes comprising: extrusion of post consumer recycled polymer composition comprising 80% to 95% (w/w) of an post consumer recycled resin; and 5% to 20% (w/w) of at least one additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

2 Claims, No Drawings

POST CONSUMER RECYCLED RESIN COMPOSITION AND MANUFACTURE OF TUBES THEREFROM

TECHNICAL FIELD

The present disclosure relates to a composition comprising a post consumer recycled resin and at least an adhesive additive; and a process for manufacture of tubes from said composition.

The present disclosure also relates to a laminate comprising the post consumer recycled composition.

BACKGROUND

Conventionally tubes are used in large quantities for the packaging and dispensing of various commodities, such as cosmetics, ointments, shampoo, toothpaste, ketchup, and the like. The tubes are usually made of plastic polymers as plastic polymers provides many advantages such as physical properties of strength, light weight, durability, non-toxicity, light and heat resistance, reusability, recyclability, inertness towards chemicals, etc. for packaging purposes. However, with increasing environment awareness and more hazards like non-degradation, toxic release over thermal decomposition, etc., attempts are being made to recycle plastic products.

Plastic recycling is a process of recovering scrap or waste plastic products such as bottles, tubes, etc., and re process the plastic to produce other products, usually different in form from their original state. For instance, soft drink bottles would be melted down and then recycled as carpet underlining various other polymers like PP or PE can be recycled and cast as plastic chairs and tables and other articles of household use. Typically a plastic is not recycled into the same type of plastic, and products made from recycled plastics are often not recyclable for the same form of the product.

The Society of the Plastics Industry (SPI) in 1988 developed a SPI resin identification coding system which comprises a set of symbols placed on plastic products to identify the polymer type. The SPI resin identification coding system facilitates efficient separation of different polymer types for recycling. The symbols used in the SPI resin identification coding system comprises of arrows that cycle clockwise to form a rounded triangle and encloses a number, often with an acronym representing the plastic below the triangle.

WO 2004/106173 discloses a multilayer bottle in which the outer and/or inner layers may be a blend such as metallocene polyethylene and high density polyethylene (HDPE) such as one component at about 25%/75% by wt. It is disclosed that the inner and/or outer layer may be virgin or the inner and/or outer layer(s) may include some recycled resin. One of such blend is MPE/HDPE. Another PCT publication WO 2005/063875 discloses a bottle fabricated from a single layer comprising a blend of metallocene polyethylene and a homopolymer high density polyethylene. This blend contains about 10% to 90% by weight metallocene polyethylene and about 10% to about 90% by weight a homopolymer high density polyethylene. The bottle may be a trilayer structure where the inner layer and/or outer layer may include some recycled resin. One of such candidate will be blend containing metallocene polyethylene (MPE) and HDPE.

U.S. Pat. No. 8,083,064 discloses a sustainable article substantially free of virgin petroleum-based compounds that includes a container, a cap, and a label, each made from renewable and/or recycled materials. The article has a shelf life of at least two years, and is itself entirely recyclable. The container can include polyethylene, polyethylene terephthalate, or polypropylene. The cap can include polypropylene or polyethylene. The label can include polyethylene, polyethylene terephthalate, polypropylene, or paper.

The above prior arts are incorporated in their entirety by reference herein.

There is a need in the art for a post consumer recycled HDPE polymer composition and product made up of such composition having a better toughness, brittleness properties, hot tack property, seal strength and ESCR properties.

SUMMARY

The present disclosure relates to a post consumer recycled polymer composition comprising: 80% to 95% (w/w) of a post consumer recycled resin; and 5% to 20% (w/w) of at least one adhesion additive.

The present disclosure further relates to a laminate comprising the post consumer recycled polymer composition comprising 80% to 95% (w/w) of a post consumer recycled resin, and 5% to 20% (w/w) of at least one adhesion additive.

The disclosure also relates to an article made up of the said laminate of the present disclosure.

The present disclosure further relates to a process for manufacturing tubes comprising: extrusion of post consumer recycled polymer composition comprising 80% to 95% (w/w) of an post consumer recycled resin; and 5% to 20% (w/w) of at least one adhesion additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

This summary is provided to introduce concepts related to recycling of post consumer recycled tubes, which are further described below in the detailed description. This summary is not neither intended to identify essential features of the present subject matter nor is it intended for use in determining or limiting the scope of the present disclosure.

DETAILED DESCRIPTION

The present disclosure provides a post consumer recycled polymer composition comprising: 80% to 95% (w/w) of a post consumer recycled resin; and 5% to 20% (w/w) of at least one adhesion additive.

The term "adhesion additive" as used herein is defined as a suitable additive that can be added to the post consume recycled resin in order to overcome poor seal strength and poor environmental stress crack resistance properties of the laminate made of the composition, apart from overcoming brittleness. The adhesion additive is added in an amount of 5% to 20% (w/w) on the total weight of the composition; preferably 5% to 8% (w/w) on the total weight of the composition.

Non limiting example of the adhesion additive is a high performance flexible additive, such ethylene alpha-olefins copolymers, metallocene linear polyethylene additive, or an LLDPE additive. For example, the addition of LLDPE improves the Heat sealing property (Hot tack) of the HDPE Polymer. The adding of additives also improves seal strength and ESCR properties of the HDPE products such as tubes.

Notably the adhesion additives that can be used in accordance with the present disclosure are commercially available additives such as DOW Chemical's "Affinity" or ExxonMobil's "Exact".

Furthermore in order to improve the hot tack property and flexibility of the composition, a oligomer additive is added in an amount of about 5% to 8% (w/w) of the weight of the total composition. Accordingly, an aspect of the present disclosure provides a post consumer recycled polymer composition comprising: 80% to 95% (w/w) of a post consumer recycled resin; 5% to 20% (w/w) of at least one adhesion additive; and 5% to 8% (w/w) of an oligomer additive.

Further, an embodiment of the present disclosure provides a post consumer recycled polymer composition comprising: 80% to 95% (w/w) of a post consumer recycled resin; and 5% to 20% (w/w) of ethylene alpha-olefins copolymer.

Still another embodiment of the present disclosure provides a post consumer recycled polymer composition comprising: 80% to 95% (w/w) of a post consumer recycled resin; and 5% to 20% (w/w) of a metallocene linear Polyethylene additive.

The term "post consumer recycled resin" as used herein means a resin that has been recycled after being used by a consumer. In accordance with the Society of the Plastics Industry (SPI) resin identification coding system, Code 2 denotes high-density polyethylene (HDPE). HDPE or polyethylene high-density (PEHD) is a polyethylene thermoplastic made from petroleum. HDPE is defined by a density of greater or equal to 0.941 grams per cubic centimeter. HDPE has little branching, giving it stronger intermolecular forces and tensile strength than lower-density polyethylene (LDPE). The difference in strength exceeds the difference in density, giving HDPE a higher specific strength. HDPE is also harder and more opaque and can withstand somewhat higher temperatures (120° C./248° F. for short periods, 110° C./230° F. continuously). HDPE is usually used to manufacture bottles, grocery bags, milk jugs, recycling bins, agricultural pipe, base cups, car stops, playground equipment, and plastic lumber.

The HDPE products are usually not recycled into the same product as extrusion of plastic tube with 100% HDPE polymer is a difficult process because hot tack properties of virgin HDPE polymer are poor and the temperature window for hot air sealing is very narrow.

Hot tack is the strength of a heat seal immediately after sealing at a high temperature and before the seal has cooled down and reached maximum load bearing strength. Products having high hot tack are less prone to fail during and after heat sealing along the region of polymer inter diffusion that forms the closed end of the sealed tube. Hot tack is also indicative of the maximum packaging speed in the filling operation of the product. Materials having good hot tack display a low heat seal initiation temperature and broad sealing temperature window for the sealing operation. 100% HDPE polymer and the narrow temperature window for hot tack sealing make end sealing of the 100% HDPE polymer tube difficult. The hot tack property indicates the strength of the heat seal which is measured before the seal is cooled and is very important for high-speed packaging operations. The hot tack properties also denote the ability of a freshly made seal to resist puckering, or separating when stressed. The challenges are further exaggerated with the usage of post consumer recycled (PCR) HDPE resins in the products.

Accordingly the present disclosure provides a post consumer recycled polymer composition comprising: 80% to 95% (w/w) of an HDPE post consumer recycled resin; and 5% to 20% (w/w) of at least one adhesion additive.

Another embodiment provides a composition of a post consumer recycled polymer composition comprising: 80% to 95% (w/w) of a post consumer recycled resin; 5% to 20% (w/w) of at least one adhesion additive, and further comprising 1% to 2% (w/w) of an antioxidant additive, or 2% to 8% (w/w) a colorant masterbatch, or 2% to 8% (w/w) of a virgin HDPE; or mixture thereof.

Yet another embodiment of the present disclosure provides a post consumer recycled polymer composition comprising: 80% to 95% (w/w) of a post consumer recycled resin; 5% to 20% (w/w) of at least one adhesion additive; and 1% to 2% (w/w) of an antioxidant additive.

Still an embodiment of the present disclosure provides a post consumer recycled polymer composition comprising: 80% to 95% (w/w) of a post consumer recycled resin; 5% to 20% (w/w) of at least one adhesion additive; and 2% to 8% (w/w) of a colorant masterbatch.

Further, an embodiment of the present disclosure provides a post consumer recycled polymer composition comprising: 80% to 95% (w/w) of a post consumer recycled resin; 5% to 20% (w/w) of at least one adhesion additive; and 2% to 8% (w/w) of a virgin HDPE.

Further, an embodiment of the present disclosure provides a post consumer recycled polymer composition comprising: 80% to 90% (w/w) of an HDPE post consumer recycled resin; 5% to 8% (w/w) of ethylene alpha olefin co-polymer; and 2% to 8% (w/w) of a virgin HDPE.

Yet another embodiment of the present disclosure provides a post consumer recycled polymer composition comprising: 80% to 95% (w/w) of a post consumer recycled resin; 5% to 20% (w/w) of at least one adhesion additive; and 5% to 20% (w/w) of a mixture of an antioxidant additive, color masterbatch and a virgin HDPE.

An embodiment of the present disclosure provides a post consumer recycled polymer composition comprising: 90% to 95% (w/w) of an HDPE post consumer recycled resin; 5% to 8% (w/w) of at least one adhesion additive; 1% to 2% (w/w) of an antioxidant additive; and 2% to 6% (w/w) of color masterbatch.

The term "antioxidant additive" as used herein means the class of chemicals which terminates the oxidation in polymer resin. The antioxidants are added to the polymer resin to protect against degradation during the service life of the finished products. In another implementation, an antioxidant such as Techmer PM 13582 or similar chemicals are further added up to 1-2% to enhance the toughness and preventing the brittleness properties of the recycled HDPE products.

The term "color masterbatch" as used herein refers to a class of chemical which imparts color to the polymer. Non limitative examples of color masterbatch in accordance with the present disclosure include titanium dioxide ($TiO_2$), zinc disulfide ($ZnS_2$), zinc oxide (ZnO), barium sulfate ($BaSO_4$) and Calcium Carbonate ($CaCO_3$). The color masterbatch may be chosen depending upon the desired color to be imparted to the composition. The shape of the color masterbatch is not particularly limited; they may be notably granule, round, flaky, flat and so on. The white color masterbatch is preferably titanium dioxide. The titanium dioxide used in the instant compositions is any of the notably commercially available, as White Master Batch for LLDPE Films from local vendors or manufactured by Clarient, Ampacet, Schulman etc. available internationally.

The products developed using the blend of post consumer recycled HDPE resin and the above mentioned additives are marked with code 2 on the product so that the product can be part of garbage collection system. The marking of the product facilitates the collection of the product for further recycling in the desired recycling stream.

Facilitating recycling of PCR products helps in avoiding land fill problem, which is becoming critical issue. Usage of PCR products reduces the usage of virgin polyethylene (HDPE) which would have otherwise come into usage stream. Moreover using PCR products also saves precious raw materials like petroleum products which is becoming scare day by day. Post consumer recycled resins consume between 40-80% less energy than the virgin resins during their environmental foot prints and help to keep the environment greener and cleaner.

The present disclosure also provides a laminate comprising the post consumer recycled resin and at least an additive in accordance with the present disclosure. Accordingly in an embodiment, it provides a laminate comprising: an outer layer of a post consumer recycled polymer composition comprising: 80% to 95% (w/w) of a post consumer recycled resin, and 5% to 20% (w/w) of at least one adhesion additive; an middle layer of post consumer recycled polymer composition comprising 80% to 95% (w/w) of a post consumer recycled resin, and 5% to 20% (w/w) of at least one adhesion additive; and an inner layer of virgin polyethylene resins.

Another embodiment of the present disclosure provides a laminate comprising: 80% to 95% (w/w) of a post consumer recycled High Density Polyethylene (HDPE) resin, and 5% to 20% (w/w) of at least one adhesion additive; an middle layer of post consumer recycled polymer composition comprising 80% to 95% (w/w) of a post consumer recycled resin, and 5% to 20% (w/w) of at least one adhesion additive; and an inner layer of virgin polyethylene resins.

Yet another embodiment of the present disclosure provides a laminate comprising: an outer layer of a post consumer recycled polymer composition comprising: 80% to 95% (w/w) of a post consumer recycled resin, and 5% to 20% (w/w) of an ethylene alpha-olefins copolymers additive; an middle layer of post consumer recycled polymer composition comprising 80% to 95% (w/w) of a post consumer recycled resin, and 5% to 20% (w/w) of at least one adhesion additive; and an inner layer of virgin polyethylene resins.

Further, an embodiment of the present disclosure provides a laminate comprising: an outer layer of a post consumer recycled polymer composition comprising: 80% to 95% (w/w) of a post consumer recycled resin, and 5% to 20% (w/w) of a metallocene linear Polyethylene additive; an middle layer of post consumer recycled polymer composition comprising 80% to 95% (w/w) of a post consumer recycled resin, and 5% to 20% (w/w) of at least one adhesion additive; and an inner layer of virgin polyethylene resins.

An embodiment of the present disclosure provides a laminate comprising: an outer layer of a post consumer recycled polymer composition comprising 80% to 95% (w/w) of a post consumer recycled resin, 5% to 20% (w/w) of at least one adhesion additive, and 1% to 2% (w/w) of an antioxidant additive; an middle layer of post consumer recycled polymer composition comprising 80% to 95% (w/w) of a post consumer recycled resin, and 5% to 20% (w/w) of at least one adhesion additive; and an inner layer of virgin polyethylene resins.

Still, another embodiment of the present disclosure provides a laminate comprising: an outer layer of a post consumer recycled polymer composition comprising 80% to 95% (w/w) of a post consumer recycled resin, 5% to 20% (w/w) of at least one adhesion additive, and 2% to 8% (w/w) of a color masterbatch; an middle layer of post consumer, recycled polymer composition comprising 80% to 95% (w/w) of a post consumer recycled resin, and 5% to 20% (w/w) of at least one adhesion additive; and an inner layer of virgin polyethylene resins.

Another embodiment of the present disclosure provides a laminate comprising: an outer layer of a post consumer recycled polymer composition comprising 80% to 95% (w/w) of a post consumer recycled resin, 5% to 20% (w/w) of at least one adhesion additive, and 2% to 8% w/w of a virgin HDPE; an middle layer of post consumer recycled polymer composition comprising 80% to 95% (w/w) of a post consumer recycled resin, and 5% to 20% (w/w) of at least one adhesion additive; and an inner layer of virgin polyethylene resins.

Further, an embodiment of the present disclosure provides a laminate comprising: an outer layer of a post consumer recycled polymer composition comprising 80% to 95% (w/w) of a post consumer recycled resin, 5% to 20% (w/w) of at least one adhesion additive, and 5% to 20% (w/w) of a mixture of an antioxidant additive, color masterbatch, and virgin HDPE; an middle layer of post consumer recycled polymer composition comprising 80% to 95% (w/w) of a post consumer recycled resin, and 5% to 20% (w/w) of at least one adhesion additive; and an inner layer of virgin polyethylene resins.

The laminate described above, in accordance with the present disclosure, the outer and the middle layer can independently further comprise of 1% to 2% (w/w) of an antioxidant additive, or 2% to 8% (w/w) a colorant masterbatch, or 2% to 8% (w/w) of a virgin HDPE; or mixture thereof.

Yet, another embodiment of the present disclosure provides a laminate comprising: an outer layer of a post consumer recycled polymer composition comprising 80% to 95% (w/w) of a post consumer recycled resin, 5% to 20% (w/w) of at least one adhesion additive, and 1% to 2% (w/w) of an antioxidant additive; and 2% to 6% (w/w) a color master batch; an middle layer of post consumer recycled polymer composition comprising 80% to 95% (w/w) of a post consumer recycled resin, and 5% to 20% (w/w) of at least one adhesion additive, and an inner layer of virgin polyethylene resins.

Another embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive; an middle layer of post consumer recycled polymer composition comprising 80% to 95% (w/w) of a post consumer recycled resin, and 5% to 20% (w/w) of an ethylene alpha-olefins copolymers additive; and an inner layer of virgin polyethylene resins.

Still, another embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive, an middle layer of post consumer recycled polymer composition comprising 80% to 95% (w/w) of a post consumer recycled resin, and 5% to 20% (w/w) of a metallocene linear Polyethylene additive; and an inner layer of virgin polyethylene resins.

Further an embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive, an middle layer of post consumer recycled polymer composition comprising 80% to 95% (w/w) of a post consumer recycled High Density Polyethylene (HDPE) resin, and 5% to 20% (w/w) of at least one adhesion additive, and an inner layer of virgin polyethylene resins.

Yet, another embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive, an middle layer of post consumer recycled polymer composition comprising 80% to 95% (w/w) of a post consumer recycled resin, 5% to 20% (w/w) of at least one adhesion additive, and 1% to 2% (w/w) of an antioxidant additive; and an inner layer of virgin polyethylene resins.

Further, an embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive, an middle layer of post consumer recycled polymer composition comprising 80% to 95% (w/w) of a post consumer recycled resin, 5% to 20% (w/w) of at least one adhesion additive, and 2% to 8% (w/w) of color master batch; and an inner layer of virgin polyethylene resins.

Still, another embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive, an middle layer of post consumer recycled polymer composition comprising 80% to 95% (w/w) of a post consumer recycled resin, 5% to 20% (w/w) of at least one adhesion additive, and 2% to 8% (w/w) of a virgin HDPE; and, an inner layer of virgin polyethylene resins.

Another embodiment of the present disclosure provides a laminate comprising: an outer layer of a post consumer recycled polymer composition comprising: 80% to 95% (w/w) of a post consumer recycled resin, and 5% to 20% (w/w) of at least one adhesion additive; an middle layer of post consumer recycled polymer composition comprising 80% to 95% (w/w) of a post consumer recycled resin, 5% to 20% (w/w) of at least one adhesion additive, and 5% to 20% (w/w) of a mixture of an antioxidant additive, color masterbatch and virgin HDPE; and an inner layer of virgin polyethylene resins.

Yet another embodiment of the present disclosure provides a laminate comprising: an outer layer of a post consumer recycled polymer composition comprising 80% to 95% (w/w) of a post consumer recycled resin, and 5% to 20% (w/w) of ethylene alpha olefin co-polymer; an middle layer of post consumer recycled polymer composition comprising 80% to 95% (w/w) of a post consumer recycled resin, and 5% to 20% (w/w) of ethylene alpha olefin co-polymer; and an inner layer of virgin polyethylene resins.

The laminates for making tubes are made of three layers namely an outer layer, a middle layer, and an inner layer. Generally, in manufacture of post consumer recycled plastics, the middle and outer layers are made using post consumer recycled (PCR) resins; whereas the inner layer which comes into contact with product contained inside the tube is made using virgin resins. Virgin polyethylene resins are the resins which are used straight after the production of the resins and are not recycled.

The present disclosure further provides an article made of the laminate as disclosed in the present disclosure.

The present disclosure also provides a process for manufacturing tubes comprising: extrusion of post consumer recycled polymer composition comprising 80% to 95% (w/w) of an post consumer recycled resin; and 5% to 20% (w/w) of at least one adhesion additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

An embodiment of the present disclosure provides a process for manufacturing tubes comprising: extrusion of post consumer recycled polymer composition comprising 80% to 95% (w/w) of a High Density Polyethylene (HDPE) resin; and 5% to 20% (w/w) of at least one adhesion additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Yet another embodiment of the present disclosure provides a process for manufacturing tubes comprising: extrusion of post consumer recycled polymer composition comprising 80% to 95% (w/w) of an post consumer recycled resin; and 5% to 20% (w/w) of an ethylene alpha-olefins copolymers additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Still, an embodiment of the present disclosure provides a process for manufacturing tubes comprising: extrusion of post consumer recycled polymer composition comprising 80% to 95% (w/w) of an post consumer recycled resin; and 5% to 20% (w/w) of a metallocene linear Polyethylene additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Another embodiment of the present disclosure provides a process for manufacturing tubes comprising: extrusion of post consumer recycled polymer composition comprising 80% to 95% (w/w) of an post consumer recycled resin; and 5% to 20% (w/w) of an adhesion additive and further comprising 1% to 2% (w/w) of an antioxidant additive, or 2% to 8% (w/w) a colorant masterbatch, or 2% to 8% (w/w) of a virgin HDPE; or mixture thereof, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Further, an embodiment of the present invention provides a process for manufacturing tubes comprising: extrusion of post consumer recycled polymer composition comprising 80% to 95% (w/w) of an post consumer recycled resin; 5% to 20% (w/w) of at least one adhesion additive; and 1% to 2% (w/w) of an antioxidant additive, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Yet, another embodiment of the present invention provides a process for manufacturing tubes comprising: extrusion of post consumer recycled polymer composition comprising 80% to 95% (w/w) of an post consumer recycled resin; 5% to 20% (w/w) of at least one adhesion additive; and 2% to 8% (w/w) of color masterbatch, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Another embodiment of the present invention provides a process for manufacturing tubes comprising: extrusion of post consumer recycled polymer composition comprising 80% to 95% (w/w) of an post consumer recycled resin; 5% to 20% (w/w) of at least one adhesion additive; and 2% to 8% (w/w) of a virgin HDPE, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

Yet, another embodiment of the present invention provides a process for manufacturing tubes comprising: extrusion of post consumer recycled polymer composition comprising 80% to 95% (w/w) of an post consumer recycled resin; 5% to 20% (w/w) of at least one adhesion additive; and 5% to 20% (w/w) of a mixture of an antioxidant additive, color masterbatch, and virgin HDPE, through a circular slit to form a long cylindrical hollow pipe; slicing the long cylindrical hollow pipe to form tube sleeves; forming tube shoulder and neck; and attaching the tube shoulder and the neck to the tube sleeves to obtain a tube.

The present disclosure further provides methods for manufacturing PCR tubes using extrusion techniques. The composition in accordance with the present disclosure is selected and multilayer tube body is formed using extrusion process. In extrusion process, granules of the HDPE polymer composition with additives, in accordance of the present disclosure, are heated and passed through a circular slit known as the extruder. The process of passing the heated HDPE polymer composition forms a long cylindrical hollow pipe of the HDPE polymer. In one implementation, such pipe may then be sliced into different sizes to form tube sleeves. It would be understood by those skilled in the art that the granules utilized for the formation of tube sleeves may be of one polymer or may be a combination of several different polymers.

The tube sleeve is drawn and calibrated to specific tube diameter and wall thickness and then cut precisely with the help of a computerized cutting device. The pieces of the cut tube body is then fed to a tube heading device wherein the tube shoulder and neck with exact thread profile is formed. The thread profile facilitates the easy attachment of a cap on the tube. The formed tube is then fed to a color printing machine. The color printing machine performs multicolor silk screen printing on the cut tube body where, depending upon the color requirement of the tube. In one implementation, all the printing Inks and varnish are ultra violet curing type ensuring no solvent emission. In another embodiment, the tubes may also be decorated by hot foil stamping. Yet in another implementation, the tubes can be also produced as transparent or variants. The tubes are then auto capped and auto packed for shipment. The entire process of tube manufacturing is carried out in a clean, dust-free environment.

Although embodiments for recycling of post consumer recycled tubes has been described in a language specific to structural features and/or methods, it is to be understood that the present disclosure is not necessarily limited to the specific features or methods described.

EXAMPLES

The following examples are given by way of illustration of the present invention and should not be construed to limit the scope of present disclosure. It is to be understood that both the foregoing general description and the following detailed description are exemplary and explanatory only and are intended to provide further explanation of the claimed subject matter.

Example 1

80% (w/w) of post consumer recycled HDPE is blended with 20% (w/w) of adhesion additive, such as ethylene alpha olefin co-polymer, commercially available in the market with the trade name Affinity (Dow Chemicals) or Exact (ExxonMobil) to produce a post consumer recycled polymer composition.

Example 2

92% (w/w) of post consumer recycled HDPE is blended with 8% (w/w) of adhesion additive, commercially available in the market with the trade name Affinity (Dow Chemicals), to produce a post consumer recycled polymer composition. The same composition can also be prepared by adding 8% (w/w) of adhesion additive, commercially available in the market with the trade name Exact (ExxonMobil),

Example 3

90% (w/w) of post consumer recycled HDPE is blended with 5% (w/w) of adhesion additive, such as ethylene alpha olefin co-polymer and 5% (w/w) of colorant mastrbatchto produce a post consumer recycled polymer composition.

Example 4

90% (w/w) of post consumer recycled HDPE is blended with 8% (w/w) of adhesion additive, such as ethylene alpha olefin co-polymer and 2% (w/w) of antioxidant additive to produce a post consumer recycled polymer composition.

Example 5

94% of post consumer recycled HDPE, 2% antioxidant additive and 4% colorant master batch and is taken to make into an article or a laminate.

Example 6

A three layered laminate is prepared by extrusion process. The outer layer and middle layer of the laminate are made up of post consumer recycled polymer composition, as prepared in any of the examples 1 to 5. The inner layer is made up of virgin resin. The three layers outer layer, middle layer and inner layer are co-extruded to form the three layered laminate.

Test Results

| | Environmental stress crack Test result | | | |
| --- | --- | --- | --- | --- |
| | Test standard, ASTM D1693-07 | | | |
| Variants | Result in hours (min.) | Result in hours (max.) | Hot tack/ sealability | Surface smoothness |
| 100% PCR HDPE tube | <40 | — | Poor | poor |
| PCR tubes with additive formulations | — | >96 | Good | Good |

The subject matter has been described in detail with reference to certain preferred embodiments thereof, other embodiments are possible. As such, the spirit and scope of the disclosure should not be limited to the description of the preferred embodiment contained therein.

We claim:

1. A laminate comprising: an outer layer of a post-consumer recycled polymer composition consisting of 80% to 95% (w/w) of a post-consumer recycled resin, and 5% to 20% (w/w) of ethylene alpha olefin co-polymer; a middle layer of post-consumer recycled polymer composition consisting of 80% to 95% (w/w) of a post-consumer recycled resin, and 5% to 20% (w/w) of ethylene alpha olefin co-polymer; an inner layer comprising a virgin polyethylene resins, and wherein the post-consumer recycled resin is a High Density Polyethylene (HDPE) resin.

2. An article made from the laminate as claimed in claim 1.

* * * * *